Patented Aug. 11, 1931

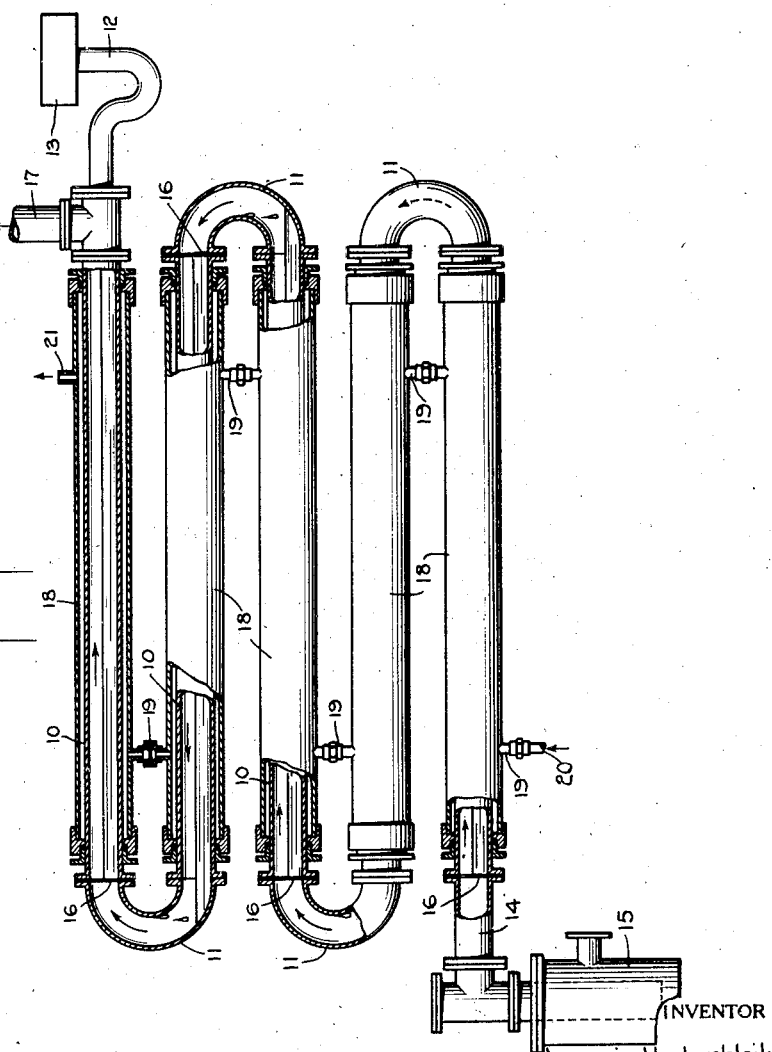

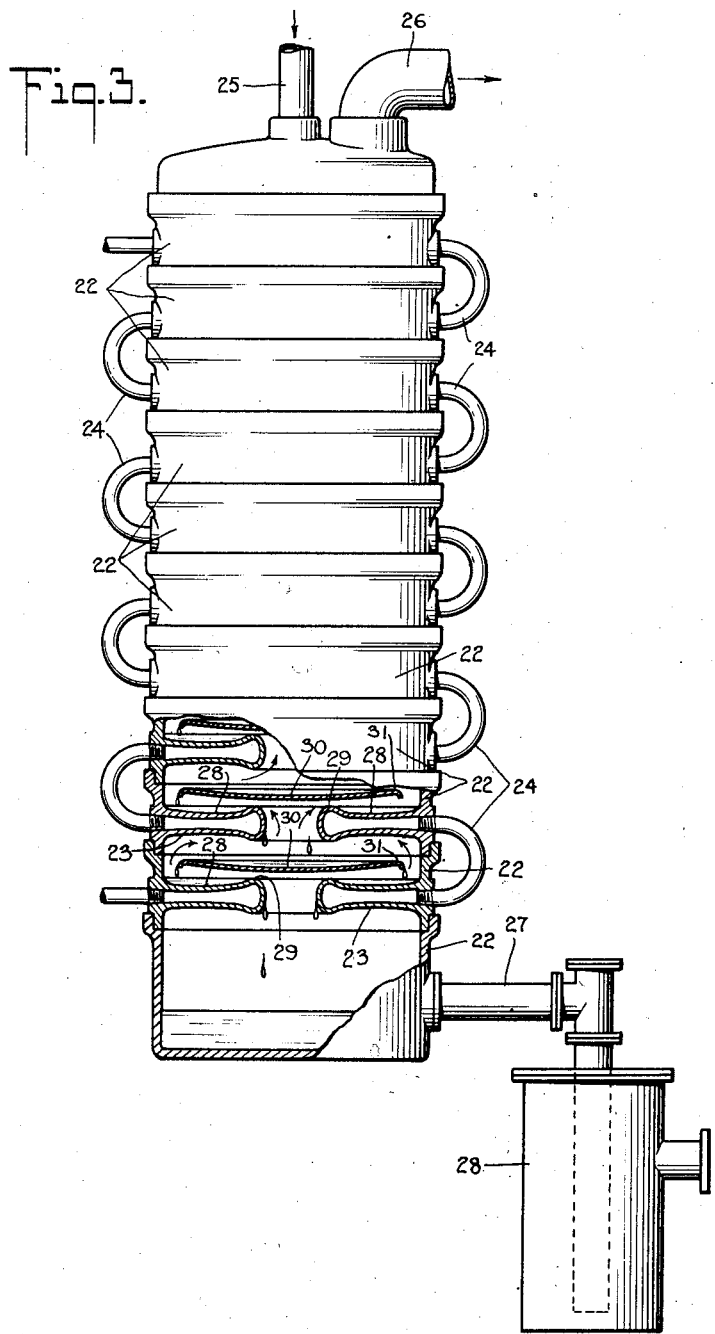

1,818,711

UNITED STATES PATENT OFFICE

INGENUIN HECHENBLEIKNER, OF CHARLOTTE, NORTH CAROLINA, ASSIGNOR, BY MESNE ASSIGNMENTS, TO CHEMICAL CONSTRUCTION CORPORATION, A CORPORATION OF DELAWARE

APPARATUS FOR CONCENTRATING NITRIC ACID

Application filed February 24, 1928. Serial No. 256,561.

This invention relates to a method of and apparatus for treating nitric acid, and has special reference to the provision of an improved method of concentrating aqueous nitric acid and of separating the same from an admixture of aqueous nitric acid and a dehydrating agent such as concentrated sulphuric acid.

A number of methods have been employed in the arts for concentrating aqueous nitric acid or for separating the same from an admixture of the aqueous nitric acid with sulphuric acid, the separation or/and concentration of the nitric acid being effected either by external or internal heat treatment.

In one of these known internal heat treatment methods, the aqueous nitric acid in mixture with sulphuric acid or other suitable dehydrating agent, is passed against a counter-flowing current of steam, the conditions of operation being such that highly concentrated vapors of nitric acid are obtained, the aqueous content thereof being absorbed and retained by the dehydrating agent. While nitric acid of substantially high strengths may be thus obtained, this method suffers the disadvantage that the sulphuric acid is unduly diluted by the steam used in the process, which steam when converted into water, is absorbed by the sulphuric acid.

In another of these known internal heat treatment methods, the acid mixture is passed downward through a column through which hot air or other gases are passed upward and counter-current to the acid flow, the hot air or gas supplying the heat for distilling off the nitric acid. This method, however, is attended with a number of objections, since the air must not be too hot, due to its effect in causing local overheating and decomposition of the nitric acid, and control of the temperature of the air requires the use of a large quantity of air and apparatus of substantial magnitude, and since furthermore the nitric acid vapor is diluted with the air or other gas used, and ofttimes contaminated thereby, the dilution interfering with the subsequent condensation of the nitric acid vapors.

Methods of supplying the distilling heat to the mixture externally of the concentrating tower or chamber have heretobefore been suggested but none of these, as far as I am aware, has been found of such efficiency as to warrant commercial success. In accordance with one suggested method the admixture of acids is passed through a vertical pipe containing a filling mass, and the pipe is heated from the outside. In this method, however, it is difficult to obtain a uniform distribution of the mixture in the concentrating tower so that local overheating and decomposition of the nitric acid occurs, this difficulty being accentuated by the inability of applying a uniform heat treatment to the acid mixture. Moreover, this method also necessitates apparatus of large dimensions resulting in complexity of operation and high construction and upkeep costs. To avoid these difficulties, it has also been suggested to subdivide the heat treatment by employing a plurality of retorts or concentrating chambers, using either intermittent or continuous steps of supplying the acid mixture to the concentrating retorts; but for one reason or another, none of these methods has received favorable adoption.

The prime desideratum of my present invention centers about the provision of an improved external heat treatment method of concentrating the nitric acid which is characterized by the elimination of the aforesaid disadvantages inherent in and resulting from these prior methods of concentrating the nitric acid by either internal or external heat treatment. In accordance with the principles of my present invention, the mixture of aqueous nitric acid and dehydrating agent, such as sulphuric acid, is continuously passed through a series of concentrating chambers or retorts so connected together that the acid mixture is caused to flow continuously in one direction from one retort chamber to the next counter-current to the flow therein of nitric acid vapor distilled in each of the retort chambers, the distilling heat being supplied by a heating medium applied to each of the several retorts of the series, the arrangement of the parts and the operation of the system being such that uniformly concentrated nitric acid is produced of high strengths, without contamination and without the other objections residing in the air heat treatment method, and without unduly diluting the sulphuric acid, as is the case with the steam heat treatment method.

To the accomplishment of the foregoing and such other objects as will hereinafter appear, my invention consists in the processes, the steps of the processes, the apparatus and elements thereof and the relation one to the other, as hereinafter more particularly described and sought to be defined in the claims, reference being had to the accompanying drawings which show the preferred embodiments of my invention, and in which:

Fig. 1 is a front elevational view of one form of apparatus that may be used in the practice of the method, Fig. 2 is a side elevational view thereof, and Fig. 3 is an elevational view of a modified form of apparatus that may be used in the practice of the method, with parts of the apparatus broken away to show the internal construction thereof.

Referring now more in detail to the drawings and having reference first to Figs. 1 and 2 thereof, the apparatus is shown to comprise a series of retort chambers 10, 10 which may be in the form of elongated pipes arranged in substantially vertical formation for the purpose of conserving plant space, said retort chambers being connected in series or cascade by the end elbow pipes 11, 11, the uppermost or first retort chamber 10 being provided with a feed inlet 12 having a receptacle top 13 for receiving an admixture of aqueous nitric acid and strong sulphuric acid, and the last or lowermost retort chamber of the series being provided with an outlet 14 for the sulphuric acid or other dehydrating agent, the said outlet communicating with the sulphuric acid tank 15.

Each of the retort chambers 10 is constructed to provide a long and shallow receptacle for holding a shallow body of the acid admixture, the construction being designed to afford an extended surface or area of treatment having a substantial volume. This is accomplished by the design and construction of the retort chambers and by the provision of dams 16, 16 arranged at the discharge end of each pipe chamber, the level of the acid admixture in each chamber being determined by the height of these dams, and the dams controlling the overflow movement of the acid mixture from one chamber 10 to the next chamber 10 therebelow. The arrangement and construction of the retort chambers, as well as the manner of interconnecting the same in cascade by the elbows 11 are such that spaces are provided in the several retort chambers above the level of the acid therein, the spaces communicating with one another so that a continuous path is provided for the flow of nitric acid vapors produced in the several chambers. This flow of nitric acid vapors through the chambers in cascade is counter-current to the acid flow therein, and has exit at a discharge or exit duct 17 arranged at the entrant end of the uppermost chamber 10 of the series, the said duct being connected to suitable vapor condensing apparatus of any improved type known in the art.

By reference to Fig. 1 of the drawings, it will be noted that the dams 16 form means for determining the level of the liquid treated in a retort and for controlling the overflow movement of the liquid from one retort chamber to the next retort chamber of the series, and that each such dam with its associated connecting elbow 11 forms a spillway for spilling the liquid over from one retort chamber to the next lower retort chamber of the series. This spillway functions to break up the body of the admixture treated in a retort as the admixture moves from one retort to the next lower retort of the series, and this breaking up of the body in producing a trickling flow of the admixture produces a large surface of agitation which results in a great liberation of the gases or vapors at the spillways. This intimate breaking up of the liquid body also increases the acting surface for reabsorbing any water which may be driven off by the excess heat in any of the lower retorts.

For distilling or driving off the nitric acid vapors from the acid mixture, i. e. for denitrating the same each of the retort chambers 10 is provided with means for supplying heat externally thereto; and I have found that the heat treatment may be accomplished with great efficiency by providing each of the pipe retorts 10 with a jacket 18 affixed to the pipe retort in any desired way, as indicated in the drawings, the series of jackets 18 being preferably connected in series or cascade by the interconnecting pipe sections 19, 19. Through these jackets is conducted a fluid heating medium, such for example as hot oil, the flow of the heating medium being preferably counter-current to the acid flow in the retorts, the inlet for the heating medium being therefore provided at 20 and the outlet a 21.

An important desideratum in an apparatus of the nature thus far described is the regulation of the temperature of the separate retort chambers. This regulation of temperature must be progressive for all of the pipes and definite gradients should be observed. Thus if the temperature is too high in the last pipe retort of the series, water will be evaporated which has to be condensed in the earlier or upper pipe retorts. On the other hand, if the temperature is too low, insufficient denitration takes place. The temperature of the last or lowermost pipe of the series requires to be controlled with considerable finesse. This is accomplished by the invention as a result of the provision of the separate jackets 18 individual to the heating or retort chambers, each chamber being separately heated. The use of the individual heating jackets is thus superior to the use of a common furnace for the retorts as an operating system. Furthermore, the use of such individual heating jackets offers considerable advantages over the use of a common furnace in simplifying the construction of the plant and in minimizing the upkeep charges incident thereto.

In the practice of the process, the aqueous nitric acid mixed with the concentrated sulphuric acid is controllably fed into the feed inlet 12, and parts of the chambers 10 are filled with the acid admixture which flows continuously from one chamber to the next, each chamber being subjected to an intense and uniform application of heat derived from the fluid heating medium. A large surface of a substantial volume of the acid admixture is thus always under a uniform treatment, resulting in the generation in each chamber or retort of nitric acid vapors, the vapors in one chamber joining those generated in the next adjacent chamber thereabove and flowing counter-current to the acid flow; the vapors having exit at the discharge duct 17. Preferably the greatest heat is supplied at the lowermost concentrating chamber 10 so that all of the residual nitric acid therein is driven off and so that a high heat efficiency is produced. By virtue of the continuous path provided by the successive chambers for the vapor flow, any water driven off in the lower retorts by the heat is reabsorbed by the relatively cold strong acid over which it passes in the upper retorts so that only concentrated nitric acid is produced in the condensers, this being a very important object attained by the process.

Preferably the retort pipes 10 are made of an acid-proof iron, such as iron containing silicon, known in the trade as "Duriron", "Corrosiron", "Tantiron", etc. The starting sulphuric acid may be of about 92% strength and the finishing sulphuric acid may leave at about 80% strength; and where an acid-proof iron is employed the process may be regulated to permit the finishing acid to be of lower strength, such as about 66%. Where these lower strengths are permitted, it will be understood that in view of the absence of any steam as an internal heating medium, greater quantities of nitric acid may be treated and obtained for equal amounts and gradients of sulphuric acid as compared with the steam heat treatment method. In lieu of employing hot oil as the heating fluid, I may use a high pressure steam of sufficient temperature. Also, in order to reduce the boiling point of the acid, to facilitate denitration I may subject the spaces above the acid level in the chambers to vacua. The temperature of the heating fluid is preferably regulated so that the sulphuric acid at the exit of the system is heated to substantially its boiling point. While I have shown the retorts arranged in substantially vertical formation to secure economy of plant space, it will be apparent that this arrangement may be altered.

Referring now to Fig. 3 of the drawings, I show a modified form of apparatus for practicing the process of the invention. In this form of the invention I provide a plurality of retort sections 22, 22 stacked in vertical formation, each providing a receptacle for a shallow body of the acid mixture, connected together internally for acid flow communication, each of the retort sections 22 being provided with an annular heating space which may be generally described as a jacket 23, the said jackets being interconnected in cascade by means of the pipe sections 24, 24. The uppermost retort section 22 is provided with the acid feed inlet 25 and the vapor exit duct 26, and the lowermost retort section 22 is provided with the sulphuric acid outlet 27 communicating with the acid tank 28.

The retort sections 22 may be made in the form shown in Fig. 3 so that the sections may be nested together; and the said sections are constructed so as to provide for the continuous flow of acid downwardly and the continuous counter-current flow of the distilled vapors upwardly. To achieve these results, each retort chamber 22 is shaped to provide an annular dished portion 28 having an overflow dam 29 and a separate dished section 30, the periphery 31 of which also forms an overflow dam, the said separate dished section 30 being supported within the retort chamber in the manner indicated in Fig. 3 of the drawings. With this construction it will be understood that the overflow from an annular dished container 28 of one chamber 22 drips or flows onto the dished section 30 of the next succeeding chamber 22 and the overflow from the dished section 30 of a chamber drips or flows onto the annular dished container of the same chamber 22. It will also be seen that the jacket 23 supplies an intense and concentrated heat uniformly over the surface of the annular dished container under treatment. The counter-current flow of the distilled vapors moves through the clearances and spaces provided by and between the batch containers for the acid mixture.

The method of practicing the process with either form of apparatus described and the many advantages thereof will, in the main, be fully apparent from the above detailed description thereof. It will be further apparent that while I have shown and described my invention in the preferred forms, many changes and modifications may be made in the structure disclosed without departing from the spirit of the invention, defined in the following claims.

I claim:

1. An apparatus for separating nitric acid from an admixture of aqueous nitric acid and a dehydrating agent comprising a plurality of enclosed retort chambers, obstruction means to obstruct and to retain in each chamber a body of liquid which is shallow but of appreciable depth, means so connecting the chambers in cascade as to cause liquid flow in one direction while permitting gaseous or vapor flow in the reverse direction over the tops of the shallow bodies of liquid, means individual to each of said chambers for supplying a heating medium externally to said chambers, a feed inlet for the acid and dehydrating agent for the series of chambers, an outlet for the dehydrating agent associated with the last chamber of the series, and an exit duct for the nitric acid vapors associated with the first chamber of the series.

2. An apparatus for concentrating aqueous nitric acid and for separating the same from an admixture of aqueous nitric acid and concentrated sulphuric acid comprising a plurality of pipe-shaped retort chambers arranged in vertical relation, obstruction means to obstruct and to hold in each of said chambers a body of liquid which is shallow but of appreciable depth, means connecting the pipe chambers in cascade for gravitational liquid flow communication, the spaces in said chambers above the shallow bodies of the liquid admixture and the said connecting means also defining a continuous path for the flow of nitric acid vapors in a reverse direction relative to the flow of liquid, means for supplying a heating medium externally to said chambers sufficient to drive off the nitric acid as nitric acid vapors, a feed acid inlet for the series of chambers, an outlet for the diluted sulphuric acid associated with the lowest chamber of the series, and an exit duct for the nitric acid vapors associated with the topmost chamber of the series.

3. An apparatus for separating nitric acid from an admixture of aqueous nitric acid and sulphuric acid comprising a plurality of enclosed retort chambers arranged in substantially vertical formation, obstruction means to obstruct and to retain in each chamber a body of liquid which is shallow but of appreciable depth, means so connecting the chambers in cascade as to cause liquid flow in one direction while permitting gaseous or vapor flow in the reverse direction over the tops of the shallow bodies of liquid, heating jackets for said retort chambers, means for supplying a fluid heating medium to said jackets for externally heating said chambers, a feed acid inlet for the series of chambers, an outlet for the sulphuric acid associated with the last chamber of the series, and an exit duct for the nitric acid vapors associated with the first chamber of the series.

4. An apparatus for separating nitric acid from an admixture of aqueous nitric acid and a dehydrating agent comprising a plurality of enclosed retort chambers, obstruction means to obstruct and to retain in each chamber a body of liquid which is shallow but of appreciable depth, means so connecting the chambers in cascade as to cause liquid flow in one direction while permitting gaseous or vapor flow in the reverse direction over the tops of the shallow bodies of liquid, heating jackets for said retort chambers also connected in cascade, means for supplying a fluid heating medium to said jackets for externally heating said chambers, the flow of the heating medium being countercurrent to said liquid flow, a feed acid inlet for the series of chambers, an outlet for the dehydrating agent associated with the last chamber of the series, and an exit duct for the nitric acid vapors associated with the first chamber of the series.

5. An apparatus comprising a series of retort chambers each adapted to hold a shallow body of a liquid to be treated, connecting members joining the chambers for continuous liquid and intimate vapor flow inter-communication, each of said retort chambers being provided at its discharge end adjacent a connecting member with means determining the level of the liquid treated in a retort and controlling the overflow movement of the liquid from one retort chamber to the next retort chamber of the series, each such means and its associated connecting member defining a spillway for spilling the liquid over from one retort chamber to the next lower retort chamber of the series.

6. A concentrating apparatus comprising a series of pipe retort chambers each adapted to hold a shallow body of a liquid to be concentrated, connecting members joining the chambers for continuous liquid and vapor flow inter-communication, each of said pipe retort chambers being provided at its discharge end adjacent a connecting member with a dam, each dam determining the level of the liquid treated in a retort and controlling the overflow movement of the liquid from one retort chamber to the next retort chamber of the series, and each dam and its associated connecting member defining a spillway for spilling the liquid over from one pipe retort chamber to the next lower pipe retort chamber of the series.

7. An apparatus for separating nitric acid from an admixture of aqueous nitric acid and sulphuric acid comprising a series of retort chambers each adapted to hold a shallow body of the admixture to be treated, connecting members joining the chambers for continuous liquid and intimate vapor flow inter-communication, each of said retort chambers being provided at its discharge end adjacent a connecting member with a dam, each dam determining the level of the liquid treated in a retort and controlling the overflow movement of the liquid from one retort chamber to the next retort chamber of the series, and each dam and its associated connecting member defining a spillway for spilling the liquid over from one retort chamber to the next lower retort chamber of the series.

8. An apparatus for separating nitric acid from an admixture of aqueous nitric acid and sulphuric acid comprising a series of pipe retort chambers each adapted to hold a shallow body of the admixture to be treated, elbow connecting members joining the pipe chambers for continuous liquid and vapor flow inter-communication, each of said pipe retort chambers being provided at its discharge end with means determining the level of the liquid treated in a retort and controlling the overflow movement of the liquid from one retort chamber to the next retort chamber of the series, each such means and its associated connecting elbow defining a spillway for spilling the liquid over from one retort chamber to the next lower retort chamber of the series, and external heating means individual to each of the retort chambers for heating the same.

9. An apparatus for separating nitric acid from an admixture of aqueous nitric acid and sulphuric acid comprising a series of enclosed retort chambers, obstruction means in each adapted to obstruct and to hold therein a body of the admixture which is shallow but of appreciable depth, means so connecting the chambers in cascade as to cause continuous liquid flow in one direction while permitting continuous vapor flow in the opposite direction over the tops of the shallow bodies of liquid, and external heating means individual to each of the retort chambers for heating the same.

10. An apparatus comprising a series of enclosed pipe shaped retort chambers, obstruction means in each adapted to obstruct and to hold therein a long body of a liquid to be treated which is shallow but of appreciable depth, means connecting the chambers in cascade for continuous liquid flow communication, the spaces in said chambers above the shallow bodies of the liquid and the said connecting means defining a continuous path for the flow of vapors evaporated from said liquid, heating jackets for said retort chambers, a heating jacket being individual to each retort chamber of the series, and means for supplying a fluid heating medium to said jackets for externally heating said chambers.

11. An apparatus for separating nitric acid from an admixture of aqueous nitric acid and sulphuric acid comprising a series of elongated enclosed pipe retort chambers, obstruction means in each adapted to obstruct and to hold therein a long body of the admixture which is shallow but of appreciable depth, means so connecting the chambers in cascade as to cause continuous liquid flow in one direction while permitting continuous vapor flow in the opposite direction over the tops of the shallow bodies of liquid, a heating jacket for each retort chamber of the series whereby said chambers may be individually and separately heated, and means for supplying a fluid heating medium to said jackets for externally heating said chambers.

Signed at New York in the county of New York and State of New York this 15th day of February A. D. 1928.

INGENUIN HECHENBLEIKNER.